United States Patent Office 3,123,610
Patented Mar. 3, 1964

3,123,610
N-(ALKANOYLPIPERIDINOALKYL)-10,11-DIHYDRO-5H-DIBENZ[b,f]AZEPINES
John W. Cusic, Skokie, Ill., assignor to G. D. Searle & Co., Chicago, Ill., a corporation of Delaware
No Drawing. Filed Dec. 14, 1959, Ser. No. 859,123
2 Claims. (Cl. 260—294.7)

This invention relates to N-[(alkanoyl/hydroxy/hydroxyalkyl)piperidinoalkyl]-10,11-dihydro-5H-dibenz[b,f]-azepines and a process for the manufacture thereof. More particularly, this invention relates to chemical compounds of the formula

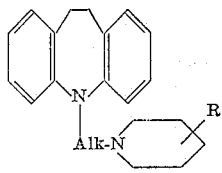

wherein Alk represents an alkylene radical and R represents a hydroxy (OH), hydroxyalkyl (alkylene-OH), or alkanoyl (alkyl-co—) radical.

Among the alkylene radicals represented by Alk in the foregoing formula, lower alkylene radicals are preferred, for example, methylene, ethylene, trimethylene, propylene, tetramethylene, 2,2-dimethyl-1,3-propylene, and like bivalent saturated acyclic straight- or branched-chain hydrocarbon groupings of empirical formula $$-C_nH_{2n}-$$

wherein $n$ is a small positive integer.

The hydroxyalkyl radicals represented by R in the formula for compounds of this invention likewise are desirably of lower order, and may be thought of as derived by replacing hydrogen with hydroxyl in an alkyl group $$C_nH_{2n+1}-$$

$n$ being an integer amounting to less than 9. Illustrative of hydroxy(lower alkyl) radicals are hydroxymethyl, 1-hydroxyethyl, 2-hydroxyethyl, 3-hydroxypropyl, 1-(hydroxymethyl)propyl, 3-hydroxybutyl, 5-hydroxypentyl, etc.

The alkanoyl radicals represented by R in the formula above also are optimally of lower order, the lower alkyl constitutent in the formula therefor $$\text{lower alkyl-CO—}$$

being such as methyl, ethyl, propyl, isopropyl, butyl, isobutyl, sec-butyl tert-butyl, pentyl, isopentyl, tert-pentyl, neopentyl, hexyl, isohexyl, heptyl, and octyl radicals.

As will be apparent to those skilled in the art from the structural formula set forth, the point of attachment of R in the piperidine nucleus is unrestricted, alpha, beta, and gamma positioning alike being within the ambit of invention laid down.

Equivalent to the basic amines of this invention for the purposes here described are non-toxic acid addition and quaternary ammonium salts thereof, the composition of which is depicted by

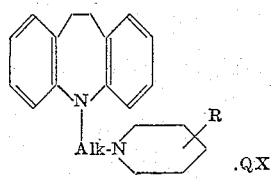

wherein Alk and R are defined as before, Q represents hydrogen or a lower alkyl, hydroxy(lower alkyl), or lower alkenyl $$C_nH_{2n-1}-$$
$$n=<9$$

radical, or an aralkyl radical such as benzyl, phenethyl, and naphthylmethyl; and X is one equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which, in combination with the cationic portion of a salt aforesaid, is neither pharmacologically nor otherwise undesirable in pharmaceutical dosage.

The compounds to which this invention relates are useful because of their valuable pharmacological properties. Distinct from piperazinoalkyldihydrodibenzazepines superficially related, the instant compounds stimulate the central nervous system, in addition to being anti-fungal agents and adapted to inhibit the heat, swelling, and redness characteristic of the inflammatory response to tissue injury.

The claimed compounds can be manufactured by contacting a chloroalkyldihydrodibenzazepines of the formula

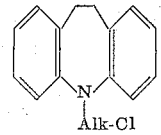

wherein Alk is defined as before, for as long as several hours at elevated temperatures in an inert solvent, with a piperidine of the formula

wherein R is defined as before. Suitable solvents are ethanol, butanone, toluene, dimethylformamide, and the like, a representative set of conditions for the contemplated manufacture being 12 or more hours at the boiling point under reflux in butanone medium.

An acid acceptor such as potassium carbonate or a tertiary amine, and a catalyst such as sodium iodide, may be incorporated in the reaction mixture if desired.

Conversion of the amine bases hereof to corresponding acid addition salts is accomplished by simple admixture of these compounds with one equivalent of any of various inorganic and strong organic acids, the anionic portion of which conforms to X as hereinabove defined.

The quaternary ammonium compounds comprehended by this invention are those derived by contacting a claimed base with one equivalent of an organic ester of the formula $$Q-X$$

Q and X being limited by the meanings hereinbefore assigned and it being additionaly provided that Q is not hydrogen. Quaternization takes place in the temperature range between 25° and 100° centigrade, using an inert solvent such as chloroform, acetone, butanone, methanol, butanol, or the like as reaction medium. Quaternization is ordinarily completed in from 1 to 48 hours and is generally carried out in a closed system if a lower alkyl halide—such as methyl chloride—is one of the reagents. Using methyl bromide, the manufacture of quaternary salts may be smoothly effected in butanone solution at 70° centigrade, the reaction time being approximately 1 hour.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade, pressures in millimeters of mercury, and relative amounts of materials in parts by weight, except as otherwise noted.

*Example 1*

A. *5 - (3-chloropropyl)-10,11-dihydro-5H-dibenz-[b,f] azepine.*—To a solution of 24 parts of 10,11-dihydro-5H-dibenz[b,f]azepine in 105 parts of anhydrous ether protected by a nitrogen atmosphere under reflux is added, with agitation at a rate just sufficient to induce boiling, 9 parts of butyllithium dissolved in 35 parts of hexane. Agitation is continued for 20 minutes after the last of the butyllithium solution has been introduced, at which point 51 parts of 3-chloropropyl p-toluenesulfonate dissolved in 35 parts of anhydrous ether is added during approximately 5 minutes. Boiling subsides shortly thereafter, whereupon wet ether is mixed in to destroy excess butyllithium; and the mixture is then washed with water. Vacuum distillation serves to remove solvent and isolate a yellow oil boiling at 150–160/0.2–0.3 mm. The product thus obtained is 5-(3-chloropropyl)-10,11-dihydro-5H-dibenz-[b,f]azepine. It tends to darken at the surface on standing.

B. *5 - [3 - (4-hydroxyiperidino)propyl]10,11-dihydro-5H-dibenz[b,f]azepine hydrochloride.*—A mixture of 60 parts of 5-(3-chloropropyl)-10,11-dihydro-5H-dibenz[b,f] azepine, 23 parts of 4-piperidinal, 60 parts of anhydrous potassium carbonate, and 33 parts of sodium iodide in 2000 parts of butanone is heated at the boiling point under reflux with agitation overnight. The mixture is then filtered, following which, solvent is removed by vacuum distillation. The residue is taken up in benzene, and the benzene solution is consecutively washed with dilute aqueous potassium hydroxide and water. The solution is thereupon extracted with dilute hydrochloric acid, and the acid extract is basified. The resultant mixture is extracted with benzene. The benzene extract, in turn, is dried over anhydrous sodium sulfate, filtered, and stripped of solvent by vacuum distillation. The residue, 5-[3-(4-hydroxypiperidino)propyl] - 10,11 - dihydro - 5H-dibenz[b,f]azepine, is converted to the hydrochloric acid salt by dissolution in 25 parts of absolute ethanol and acidification of this solution with absolute ethanolic hydrogen chloride. Upon addition of anhydrous ether and standing, the desired 5 - [3-(4-hydroxypiperidino)propyl]-10,11-dihydro-5H-dibenz[b,f]azepine hydrochloride precipitates as a crystalline solid sintering at 203° and melting at 206–209° (with decomposition). The product has the formula

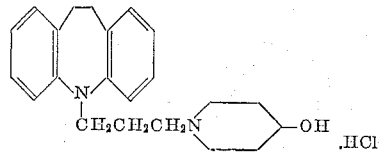

*Example 2*

*5 - [3 - (4 - hydroxymethylpiperidino)propyl] - 10,11 dihydro-5H-dibenz[b,f]azepine.*—A mixture of 65 parts of 5-(3-chloropropyl)-10,11-dihydro-5H-dibenz[b,f]azepine, 60 parts of 4-piperidinemethanol, 70 parts of anhydrous potassium carbonate, and 36 parts of sodium iodide in 2000 parts of butanone is heated at the boiling point under reflux overnight. The mixture is then filtered and stripped of solvent by vacuum distillation. The residue is taken up in benzene. The resultant benzene solution is thoroughly washed with water and then extracted with dilute hydrochloric acid. The acid extract is washed with benzene and then basified. The mixture thus obtained is extracted with benzene, and the benzene extract is washed with water. Vacuum distillation of the solvent affords a residue which is recrystallized from heptane. The product thus obtained is 5-[3-(4-hydroxymethylpiperidino)propyl] - 10,11 - dihydro-5H-dibenz[b,f]azepine, melting at 112–113° and having the formula

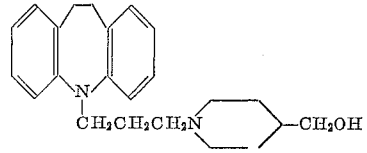

*Example 3*

*5 - {3 - [4 - (2 - hydroxyethyl)piperidino]propyl}10,11-dihydro-5H-dibenz[b,f]azepine.*—Substitution of 120 parts of 5-(3-chloropropyl)-10,11-dihydro-5H-dibenz[b,f]azepine, 57 parts of 4-piperidineethanol, 120 parts of anhydrous potassium carbonate, 66 parts of sodium iodide, and 2400 parts of butanone for the 5-(3-chloropropyl)-10,11-dihydro-5H-dibenz[b,f]azepine, 4-piperidinemethanol, potassium carbonate, sodium iodide, and butanone, respectively, called for in the foregoing Example 2 affords 5-{3-[4 - (2 - hydroxyethyl)piperidino]propyl}-10,11-dihydro-5H-dibenz[b,f]azepine, sintering at 112° and melting at 113–114.5°. The product has the formula

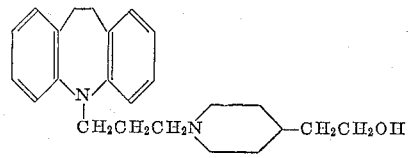

*Example 4*

A. *5 - (2-hydroxy-2-methylethyl)-10,11-dihydro-5H-dibenz[b,f]azepine.*—To a solution of 24 parts of 10,11-dihydro-5H-dibenz[b,f]azepine in 105 parts of anhydrous ether protected by a nitrogen atmosphere under reflux is added, with agitation at a rate just sufficient to induce boiling, 9 parts of butyllithium dissolved in 35 parts of hexane, followed by 8 parts of propylene oxide dissolved in 35 parts of anhydrous ether. Boiling subsides shortly thereafter, whereupon the reactants are warmed gently for 1 hour and then mixed with wet ether. The resultant mixture is washed with water, dried over anhydrous sodium sulfate, and stripped of solvent by vacuum distillation. The residue, an amber syrup, is 5-(2-hydroxy-2-methylethyl)-10,11-dihydro-5H-dibenz[b,f]-azepine.

B. *5 - (2 - chloro - 2-methylethyl)-10,11-dihydro-5H-dibenz[b,f]azepine.*—To a solution of 10 parts of 5-(2-hydroxy - 2 - methylethyl)-10,11-dihydro-5H-dibenz[b,f]azepine in 255 parts of alcohol-free chloroform is added, with agitation at 0–3° during 2 hours, approximately 6 parts of thionyl chloride dissolved in 60 parts of alcohol-free chloroform. The resultant mixture is allowed to warm slowly to room temperature, then heated at 45–50° for about 15 minutes. Heating is thereupon discontinued and the mixture let stand at room temperatures overnight. Solvent is removed by vacuum distillation, following which benzene is added and distilled off to dry the product azeotropically. The residue, a viscous tacky oil, is the desired 5 - (2 - chloro - 2 - methylethyl)-10,11-dihydro-5H-dibenz[b,f]azepine.

C. *5 - {2 - [4-(2-hydroxyethyl)piperidino]-2-methylethyl} - 10,11 - dihydro - 5H - dibenz[b,f]azepine hydrochloride.*—A mixture of 10 parts of 5-(2-chloro-2-methylethyl)-10,11-dihydro-5H-dibenz[b,f]azepine and 10 parts of 4-piperidineethanol is heated at approximately 90° under reflux for about 40 hours and then extracted with benzene. The benzene extract is thoroughly washed with water and thereupon extracted with dilute hydrochloric acid. The acid extract is washed with benzene and then made alkaline. The resultant mixture is extracted with benzene;

and this benzene extract is consecutively washed with water, dried over sodium sulfate, and freed of solvent by vacuum distillation. The residue, a sticky "glass," is 5-{2-[4 - (2-hydroxyethyl)piperidino]-2-methylethyl}-10,11-dihydro-5H-dibenz[b,f]azepine. It is converted to the hydrochloric acid salt by dissolution in absolute ethanol and acidification with ethanolic hydrogen chloride. Upon dilution with anhydrous ether and standing, the salt precipitates and is recovered by filtration, ground to a fine powder, and dried in vacuo. The product thus obtained melts at 208–210.5° and has the formula

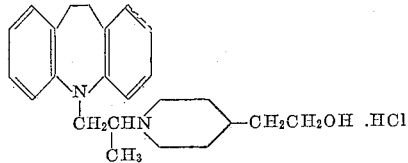

Example 5

A. *5 - (2 - chloroethyl)-10,11-dihydro-5H-dibenz[b,f]-azepine.*—To a solution of 24 parts of 10,11-dihydro-5H-dibenz[b,f]azepine in 105 parts of anhydrous ether protected by nitrogen under reflux is added, with agitation during 1 hour, 9 parts of butyllithium dissolved in 35 parts of hexane. Agitation of the mixture thus obtained is continued for 15–30 minutes after the last of the butyllithium solution is introduced, at which point 29 parts of 2-chloroethyl p-toluenesulfonate dissolved in 35 parts of anhydrous ether is added during 10–15 minutes (slowly enough to keep the reaction under control). The resultant mixture is heated at the boiling point for 3 hours, then cautiously diluted and stirred with water. The ether phase is separated, washed with water, and dried consecutively over sodium sulfate and potassium carbonate, following which it is treated with decolorizing charcoal, then filtered, and finally stripped of solvent by vacuum distillation. Crystallization of the residue from 2-propanol affords the desired 5-(2-chloroethyl)-10,11-dihydro-5H-dibenz[b,f]azepine, M.P. approximately 84.5–85.5°.

B. *5 - {2-[3-(3-hydroxypropyl)piperidino]ethyl}-10,11-dihydro-5H-dibenz[b,f]azepine hydrochloride.*—A mixture of 9 parts of 5-(2-chloroethyl)-10,11-dihydro-5H-dibenz[b,f]azepine and 10 parts of 3-piperidinepropanol is heated at around 90° for 22 hours. The mixture is then diluted with benzene; and the benzene solution is consecutively washed with aqueous potassium hydroxide and water, following which it is extracted with dilute hydrochloric acid. The acid extract, together with any insoluble oil formed during the extraction or precipitated from the extract itself on standing, is basified. The resultant mixture is extracted with benzene. The benzene extract thus obtained is washed with water and then consecutively dried over anhydrous sodium sulfate and potassium carbonate, whereupon solvent is removed by vacuum distillation. The nearly colorless residue is taken up in absolute ethanol. The ethanol solution is made barely acid with ethanolic hydrogen chloride, then filtered, warmed, and diluted with absolute ether. Precipitation occurs on standing and cooling. The precipitate is recovered on a filter, washed by trituration with anhydrous ether, and dried in vacuo. The crystalline material thus obtained is 5-{2-[3-(3 - hydroxypropyl) - piperidino]ethyl} - 10,11-dihydro-5H-dibenz[b,f]azepine hydrochloride, which melts at approximately 208.5–209° (with decomposition). The product has the formula

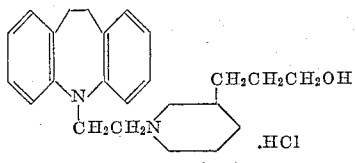

Example 6

*5 - {3 - [4 - (3 - hydroxypropyl)piperidino]propyl}-10,11-dihydro-5H-dibenz[b,f]azepine hydrochloride.*—A mixture of 100 parts of 5-(3-chloropropyl)-10,11-dihydro-5H-dibenz[b,f]azepine, 53 parts of 4-piperidinepropanol, 55 parts of sodium iodide, and 110 parts of anhydrous potassium carbonate in 2400 parts of butanone is heated at the boiling point under reflux with agitation overnight. Solids are filtered off and the solvent removed by vacuum distillation. The residue is taken up in benzene, and the benzene solution is washed with water and then extracted with dilute hydrochloric acid. The acid extract, together with any oil formed during the extraction or precipitated from the extract itself on standing, is basified. The resultant mixture is extracted with benzene. The benzene extract is washed with water, dried over anhydrous sodium sulfate, and stripped of solvent by vacuum distillation. The residue, a viscous oil, is taken up in absolute ethanol. The ethanol solution is made slightly acid with ethanolic hydrogen chloride. Upon dilution with anhydrous either, 5-{3-[4-(3-hydroxypropyl)piperidino]propyl} - 10,11 - dihydro - 5H - dibenz[b,f]azepine hydrochloride is thrown down. The product, recovered on a filter, washed thereon with anhydrous ether, and dried in vacuo, sinters at 192° and melts at 193–195°. It has the formula

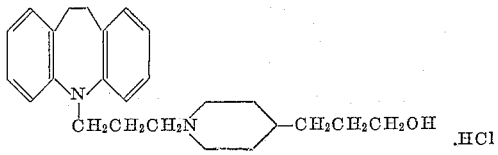

Example 7

*5 - {2 - [4 - (3 - hydroxypropyl)piperidino] - 2-methylethyl} - 10,11 - dihydro - 5H - dibenz[b,f]azepine.*—A mixture of 10 parts of 5-(2-chloro-2-methylethyl) - 10,11 - dihydro - 5H - dibenz[b,f]azepine and 11 parts of 4-piperidinepropanol is heated at 90–95° overnight. The resultant mixture is partitioned between benzene and aqueous potassium hydroxide. The benzene phase is separated and washed with water, then extracted with dilute hydrochloric acid. The acid extract, together with any oil formed during the extraction or precipitated from the extract itself on standing, is washed with benzene and thereupon made alkaline. The mixture thus obtained is extracted with benzene, and this benzene solution is washed with water and dried over anhydrous sodium sulfate. Solvent is removed by distillation and the residue purified by chromatography on silica gel, using benzene and ethyl acetate as developing solvents. The 5 - {2 - [4 - (3 - hydroxypropyl)piperidino] - 2-methylethyl} - 10,11 -dihydro - 5H - dibenz[b,f]azepine thus isolated, upon recrystallization from heptane, melts at 70–75°. It has the formula

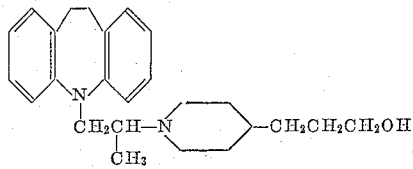

Example 8

*5 - {2 - [3 - (3 - hydroxypropyl)piperidino] - 2 - methylethyl} - 10,11 - dihydro - 5H - dibenz[b,f]azepine hydrochloride.*—A mixture of 18 parts of 5-(2-chloro-2-methylethyl) - 10,11 - dihydro - 5H - dibenz[b,f]azepine and 30 parts of 3-piperidinepropanol is heated at 90–95° for 22 hours. The mixture is then partitioned between benzene and aqueous potassium hydroxide, following which the benzene phase is separated, washed with water, and extracted with dilute hydrochloric acid. The acid extract, together with any oil formed during the extraction or separating from the extract itself on standing, is washed with benzene and then basified. The resultant mixture is extracted with benzene, and this benzene extract is washed with water and dried over anhydrous sodium sulfate. Upon evaporation of solvent, a tacky residue is obtained which is taken up in methanol. The methanol solution is filtered and made acid with alcoholic hydrogen chloride. Upon addition of absolute ether and standing in the cold, 5-{2-[3-(3-hydroxypropyl)piperidino] - 2 - methylethyl} - 10,11 - dihydro-5H-dibenz[b,f]azepine hydrochloride precipitates. The product melts at 199–208°. It has the formula

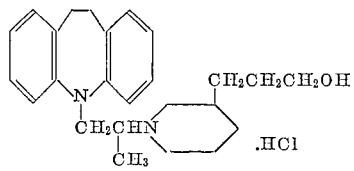

*Example 9*

A. *4-acetylpiperidine.*—To a solution of 129 parts of α-methyl-4-piperidinemethanol in 530 parts of aqueous 75% acetic acid is cautiously added, with agitation at 10–20°, 167 parts of chromic anhydride dissolved in 1670 parts of aqueous 90% acetic acid. The resultant mixture is let stand at room temperatures overnight. Excess chromic anhydride is destroyed by the addition of 2-propanol, following which the mixture is concentrated to one-third of its original volume by vacuum distillation. The concentrate is stirred into a cooled 2-phase mixture of chloroform and aqueous potassium hydroxide. The precipitate which forms is filtered off and washed with chloroform, the washings being combined with the filtrate. The chloroform phase is separated, washed with water, dried over potassium carbonate, and stripped of solvent by vacuum distillation. Distillation of the oily residue affords the desired 4-acetylpiperidine boiling at approximately 66° under 1 mm. pressure. The hydrochloride melts at 158–161° (with decomposition).

B. *5 - [3 - (4 - acetylpiperidino)propyl] - 10,11 - dihydro-5H-dibenz[b,f]azepine hydrochloride.*—A mixture of 100 parts of 5-(3-chloropropyl)-10,11-dihydro-5H-dibenz[b,f]azepine, 47 parts of 4-acetylpiperidine, 55 parts of sodium iodide, and 100 parts of anhydrous potassium carbonate in 3200 parts of butanone is heated with agitation at the boiling point under reflux for 16 hours. The mixture is then chilled and filtered. The filtrate is stripped of solvent by vacuum distillation. The residue is taken up in benzene, and the benzene solution is washed several times with water. It is then extracted with warm dilute hydrochloric acid. The acid extract is basified and the resultant mixture extracted with benzene. This benzene extract is washed with water, dried over anhydrous sodium sulfate, treated with decolorizing charcoal, filtered, and freed of solvent by distillation. The residue a yellow oil, is taken up in absolute ethanol. The ethanol solution, filtered, made slightly acid with absolute alcoholic hydrogen chloride, warmed, and diluted with anhydrous ether, precipitates on standing. The desired 5-[3 - (4 - acetylpiperidino)propyl] - 10,11 - dihydro - 5H-dibenz[b,f]azepine hydrochloride is thus obtained as fine needles which, filtered off and dried in vacuo, melt at 214–217° (with decomposition). The product has the formula

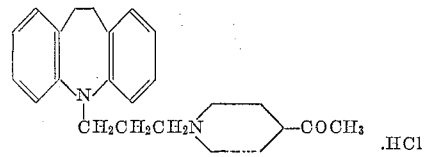

*Example 10*

*5-[2-(2-propionylpiperidino) ethyl]-10,11-dihydro-5H-dibenz[b,f]azepine.*—A mixture of 50 parts of 5-(2-chloroethyl)-10,11-dihydro - 5H - dibenz[b,f]azepine and 56 parts of 2-propionylpiperidine is heated at 90–100° for 24 hours, then partitioned between benzene and aqueous potassium hydroxide. The benzene phase is separated and washed with water, following which it is extracted with dilute hydrochloric acid. The acid extract, together with any oil formed during the extraction or precipitated from the extract itself on standing, is basified. The resultant mixture is extracted with benzene. This benzene extract is washed with water, dried consecutively over anhydrous sodium sulfate and potassium carbonate, and finally stripped of solvent by vacuum distillation. The residue is 5-[2-(2-propionylpiperidino) ethyl]-10,11-dihydro-5H-dibenz[b,f]azepine, of the formula

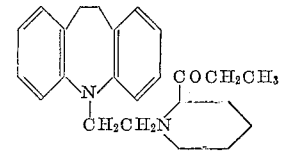

What is claimed is:
1. A compound of the formula

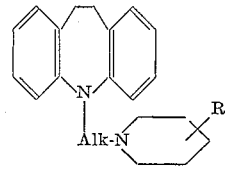

wherein Alk represents an alkylene radical of the formula

—C$_m$H$_{2m}$— in which *m* represents a positive integer less than 8 and R represents an alkanoyl radical of the formula

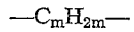

wherein *n* represents a positive integer less than 9.

2. 5-[3-(4-acetylpiperidino)propyl] - 10,11 - dihydro-5H-dibenz[b,f]azepine.

References Cited in the file of this patent
UNITED STATES PATENTS
2,926,164   Cusic et al. _____ Feb. 23, 1960
FOREIGN PATENTS
215,335   Australia _____ June 11, 1958